US007313227B2

(12) United States Patent
Jones

(10) Patent No.: US 7,313,227 B2
(45) Date of Patent: Dec. 25, 2007

(54) ANIMATED/DIGITALLY DEPICTED INTERACTIVE VOICE SESSION SERVICES OVER AN IP NETWORK

(75) Inventor: Keith Aaron Jones, Bronx, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 550 days.

(21) Appl. No.: 10/374,942

(22) Filed: Feb. 26, 2003

(65) Prior Publication Data

US 2004/0165703 A1    Aug. 26, 2004

(51) Int. Cl.
*H04M 11/06* (2006.01)
(52) U.S. Cl. .............................. 379/88.13; 379/93.23; 379/207.15; 455/415; 704/272
(58) Field of Classification Search ............. 379/88.13, 379/88.18, 88.19, 88.21, 142.06, 142.16, 379/142.01, 207.15, 93.23; 455/415
See application file for complete search history.

(56) References Cited

U.S. PATENT DOCUMENTS

| 5,999,599 | A | * | 12/1999 | Shaffer et al. ........... 379/93.23 |
| 6,675,008 | B1 | * | 1/2004 | Paik et al. .................. 455/415 |
| 6,798,872 | B1 | * | 9/2004 | Matsumoto et al. ... 379/142.01 |
| 6,831,969 | B2 | * | 12/2004 | Ju .......................... 379/142.16 |
| 2003/0022659 | A1 | * | 1/2003 | Mun et al. .................. 455/415 |
| 2003/0032413 | A1 | * | 2/2003 | Aksu et al. ................. 455/415 |
| 2003/0147518 | A1 | * | 8/2003 | Albal et al. ............ 379/207.15 |

* cited by examiner

*Primary Examiner*—Gauthier Gerald

(57) ABSTRACT

A telecommunications service application. The application includes associating, each of a plurality of subscribers with at least one respective avatar, where the at least one avatar includes at least one of a visual avatar and an audible avatar. In response to a first subscriber attempting to establish a communications link to a second subscriber, at least one avatar associated with the first subscriber is transmitted to the second subscriber.

30 Claims, 5 Drawing Sheets

ANIMATED/DIGITALLY DEPICTED INTERACTIVE VOICE SESSION SERVICES OVER AN IP NETWORK

FIELD OF INVENTION

The present invention relates to IP telephony services. More specifically, the present invention relates to a service for providing visual caricatures in a voice over IP (VoIP) environment.

DESCRIPTION OF THE BACKGROUND ART

Under current Internet protocol (IP) telephony network environments, service providers offer Caller ID and Caller Name services. With these services, a called party is notified of the telephone number or uniform resource locator (URL) of the calling party and the name/user name of the calling party. Such information is stored in a central database owned and maintained by a telephone company. The Caller ID and Caller Name information is sent to the called party prior to the called party answering the call.

The main purpose of this information is to allow the called party to screen the incoming call and decide if the called party wants to answer the call, terminate the call, or send the call to a voice mail system. The called party must subscribe to the service and have special equipment on the premise to receive and display such information. Although these services are popular, they have many limitations and drawbacks.

For example, the amount of information about the caller is limited to the name/user name and calling number/URL. The service only identifies the caller's name if the call originates from a residence or single line business. If the call originates from a PBX or a Centrex group, the only information provided to the called party is the name of the company providing the PBX or Centrex service.

An additional drawback is that the telephone company maintains subscriber data such that a caller who is a subscriber cannot update or edit the information, and/or may not want their name and number displayed to everyone they call. Further, in instances where a caller is traveling and using a different line, the Caller ID and Caller Name that is displayed identifies the premises, (or name/user name of the owner of the line) but not the actual caller. Other limitations include delivery of the same information every call even though the caller may be calling for various business, social or personal reasons; the service is fixed to letters and numerical characters; and there is a lack of flexibility to address visual presence capabilities.

SUMMARY OF THE INVENTION

The disadvantages heretofore associated with the prior art, are overcome by the present invention of a telecommunications service application. The application includes associating, each of a plurality of subscribers with at least one respective avatar, where the at least one avatar includes at least one of a visual avatar and an audible avatar. In response to a first subscriber attempting to establish a communications link to a second subscriber, at least one avatar associated with the first subscriber is transmitted to the second subscriber.

The apparatus comprises a calling party subscriber device coupled to the IP network for initiating an incoming call, and a called party subscriber device coupled to the IP network for receiving the incoming call. At least one softswitch having a subscriber database is coupled to the IP network, and at least one application server having a profile database is also coupled to the IP network. The profile database stores visual caricatures and audible messages that serve as a call alert for an incoming message sent to the called party subscriber device, where the called party subscriber device presents the call alert to a called party.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a user defined calling caricature or avatar (i.e., visual display) that is associated with a provisioned voice announcement, which together, may be used to alert a called party of an incoming call being placed over an IP network. In one embodiment, the calling party accesses a web-based provisioning tool to select the attributes of the caricatures along with voice announcements (e.g., pre-recorded or user recorded) to accompany the visual caricature during the alert. The visual caricatures may take the form of a digital image, such as a digital picture of the calling party, or an animated image representing some character, interest, location, or other visual indicia (e.g., company trademark, hobby, and the like) the caller desires to be displayed to others. It is noted that other still and/or moving imagery may also be used.

A party being called (i.e., a called party who is also a subscriber of the service) is alerted of an incoming call by the digital caricature and voice announcement sent by the calling party during an alerting phase of the call. The called party may view the personalized caricature, as well as listen to the voice announcement, thereby enabling the called party to screen such incoming call. That is, the called party is provided additional call related information, beyond the basic caller name/user-name and number/URL information, to assist in deciding whether to answer, terminate, or send the call to a voice-mail system. In another aspect of the invention, the caricature may be utilized or modified to another caricature during the voice sessions between the parties.

Figure 1:
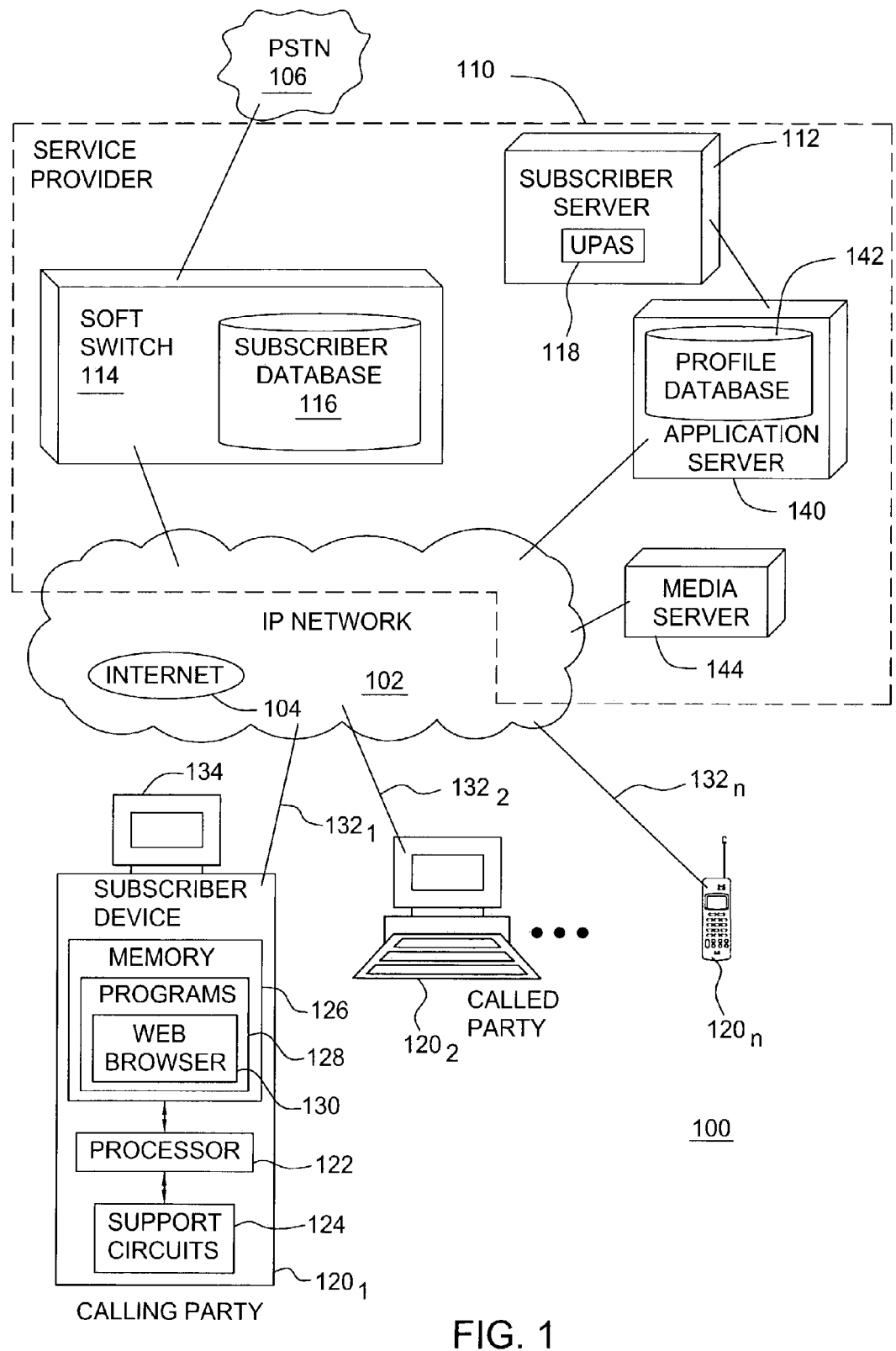
FIG. 1 depicts an exemplary IP telephony communications network environment in which the present invention may be employed.

FIG. 1 depicts an exemplary IP telephony communications network environment 100 in which the present invention may be employed. The exemplary IP telephony communications network environment 100 comprises a plurality of subscriber devices $120_1$, through $120_n$ (collectively, subscriber devices 120), an IP telephony communications service provider (SP) 110, and at least one IP network 102. The IP network 102 may include private IP networks, as well as public IP networks, such as the Internet 104.

The IP telephony service provider 110 is any service provider having access to resources capable of providing the various voice over IP (VoIP) services described herein, such as a telephone company, a cable television company, a wireless communications provider, among others. The service provider 110 provides IP telephony services, which include animated/digitally depicted interactive voice session (ADDIVS) services of the present invention.

The exemplary service provider 110 comprises a softswitch 114 including a subscriber database 116, a subscriber server 112, an application server 140 including a profile database 142, and a media server 114. The subscriber server 112 is coupled to the application server 140, while the softswitch 114, application server 140, and media server 114 are coupled to each other through the IP network 102 or an auxiliary communications network (not shown) such as an X.25 network. The subscriber server 112, application server 140, and media server 144 comprise at least one processor, memory, support circuits, I/O circuitry, and the like that is conventionally known in the art.

The softswitch 114 comprises, illustratively, an open application program interface (API) used to bridge a public switched telephone network (PSTN) 106 and voice over Internet protocol (VoIP) system by separating the call control functions of a phone call from the those of the media gateway (i.e., transport layer). The softswitch 114 provides mediation between packet and circuit protocols and interfaces to PSTN 106 and SS7 (signaling system 7) networks on a programmable platform. One exemplary softswitch is a LUCENT® SoftSwitch (LSS), provided by Lucent Technologies, Inc., of Murray Hill, N.J., which provides a central point of management for distributed gateways and IP endpoints. The softswitch 114 is capable of providing signaling and control protocols between circuit-switched PSTNs 106 and VoIP networks 104, under the H248, H323, SIP (session initiation protocol) signaling and/or other standards. In one embodiment, the softswitch 114 includes internal memory for facilitating the subscriber database 116. However, one skilled in the art will appreciate that other types of softswitch devices 114 may utilize a separate storage device (not shown) for facilitating the subscriber database 116.

The subscriber database 116 comprises a list of the subscribers of the IP telephony services, and includes indicia of whether the user is registered as a subscriber for the animated/digitally depicted interactive voice session (ADDIVS) service, as well as whether the user is available to take calls. Specifically, the subscriber database 116 is used to indicate the status of the user, such as being idle, busy, not registered for specific services, and the like.

The softswitch 114 facilitates routing calls between the subscriber device endpoints 120 based on the status (e.g., idle registered, busy, not registered) and subscribers profile information (subscriber to the interactive voice session service/non-subscriber). It is noted that the application server 140 maintains a subscriber profile database 142 (locally or remotely) with the subscriber's pre-provisioned profile. The softswitch 114 utilizes the subscriber database 116 to determine, via the status and profile information, whether to forward the registered subscriber calling/called party information to the application servers 140 for processing (call treatment), or hand the call off to establish a "traditional" voice session between calling party and called party, such as over the PSTN 106.

The subscriber server 112 is coupled to the application server 140. The subscriber server 112 facilitates a user profile administration system (UPAS) 118. In one embodiment, the UPAS 118 is a web-based application program (tool) that allows a subscriber of the VoIP services to create a personal profile, as well as define parameters and criteria regarding when particular subject matter of the subscriber profile should be implemented during a call. For example, a subscriber may create a business profile that comprises a caricature and/or digital picture of the subscriber, as well as a particular voice message, as discussed below in further detail.

The application server 140 manages a user profile created by the users subscribing to the ADDIVS services. In one embodiment, the application server 140 comprises a profile database 142, which stores the user-defined profiles that include the caricatures and/or other imagery or audio information. The media server 144 stores provisioned audible messages defined by the users. In one embodiment, the user records an announcement for each profile created. Alternatively, the ADDIVS service may provide a pre-recorded announcement that the user may simply select for use. The application server 140 associates and coordinates the visual display (caricature) with the selected announcement for delivery to the called party.

It is noted that the decomposed architecture i.e., the dual server approach comprising the application and media servers 140 and 144, allows vendors and service providers greater flexibility to work in a multi-vendor environment, as well as the flexibility for vendors to define network architecture based on cost of goods sold (COGs) goals and/or service provider network expectations. However, one skilled in the art will appreciate that a single server device may also be implemented to provide the functionality of both the application server 140 and media server 144.

The subscriber devices 120 (illustratively shown as subscriber devices $120_1$ through $120_n$) may be any device capable of accessing the IP network 102, such as a laptop computer, PDA, wireless handheld device, and the like. That is, the subscriber devices 120 may be any devices having a digital signal processor therein to process the digital and audio information.

For example, the first subscriber device $120_1$ illustratively comprises a digital signal processor (DSP) 122, support circuitry 124, memory 126, and a display 134. The processor 122 cooperates with conventional support circuitry 124, such as power supplies, clock circuits, cache memory and the like, as well as circuits that assist in executing the software routines stored in the memory 126. As such, it is contemplated that some of the process steps discussed herein as software processes may be implemented within hardware, for example as circuitry that cooperates with the processor 122 to perform various steps. The subscriber device 120 also contains input/output (I/O) circuitry that forms an interface between the various functional elements communicating with the IP network 102. For example, in the embodiment of FIG. 1, the subscriber device 120 communicates with the IP network 102 via an asynchronous digital subscribe line (ADSL), cable connection 132 (e.g., modem). However, one skilled in the art will appreciate that any other broadband connection such as wireless communications is also contemplated as providing connectivity between the IP network 102 and the wireless subscriber devices (e.g., cellular phones and PDAs).

The subscriber devices 120 serve as endpoints in the network environment 100, and preferably utilize session initiation protocol (SIP) signaling for establishment, modification, and termination of conferencing and telephony sessions over the IP network 102. SIP signaling utilizes text-based messages and has addressing based on either a telephone number or a Web host name. For example, the SIP address for a web host name may illustratively be SIP: Jane_Doe@Lucent.com. The URL is translated into an IP address through a domain name server (DNS) and the SIP negotiates the features and capabilities of the session at the time the session is established. For example, codecs may be provided at each of the endpoints to negotiate a common set of voice and video compression algorithms prior to establishing the session. Once the session is established, the designated capabilities can be modified during the course of the call. For example, whiteboarding may be added in instances where both endpoints have whiteboard capabilities and are able to negotiate a common compression algorithm. Although the implementation of the ADDIVS service is described as utilizing SIP, a person skill in the art will appreciate that other IP based network communication standards, such as H.323, may be utilized as well.

Figure 2:
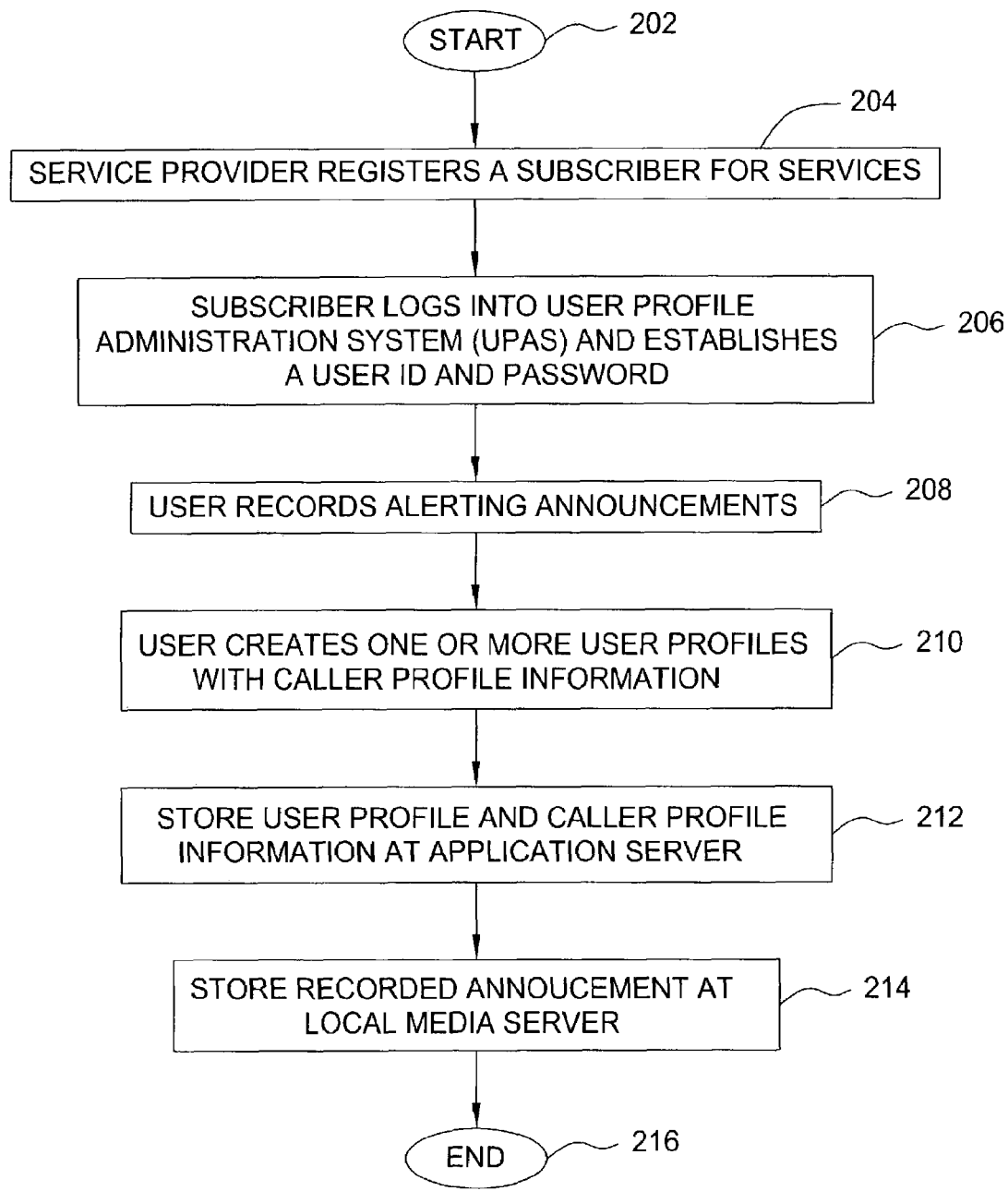
FIG. 2 depicts a flow diagram of a method for creating a caricature enhanced alert message for an interactive voice session service.

As discussed above, one inventive feature is the implementation of the caricatures or digital video that supplement the audio messages used to alert a called party of an incoming call. Another inventive feature is the ability of the subscribers to the service (i.e., users) to define their own caricatures/digital video and audible responses. FIGS. 2-4 illustrate various methods for implementing these inventive features.

FIG. 2 depicts a flow chart of a method 200 for creating a caricature enhanced alert message for an interactive voice session service. For purposes of better understanding the invention, the term "caricature" is defined as digital images such as still pictures, animated images, or any other video representation. The method 200 starts at step 202 and proceeds to step 204, where the service provider 106 registers a subscriber for services. In particular, the subscriber registers for services (e.g., VoIP services) with a service provider over the IP network 104 via their subscriber device 120. The service provider 106 stores a basic subscriber profile in the local subscriber database 116 associated with the softswitch 114, as well as profile information in the profile database 142 of the application server 140 to define service attributes (caricature related information). It is noted that the basic subscriber profile includes information such as name, phone number, billing information, and the like. In one embodiment, the subscribers may register directly with the softswitch 114.

Registering a subscriber directly at the softswitch 114 provides various benefits, such as allowing the subscriber database 116 to generate call detail records (CDRs) for billing purposes, as well as managing the subscribed services of the individual callers. It is desirable that the softswitch maintain control of the subscriber services. In particular, the softswitch 114 is able to rout calls to the appropriate application servers 140, proxy servers/location server (not shown), and the like for completing the calls, since the softswitch 116 is able to monitor the state of each call from the subscriber database. Further, the softswitch 116 may utilizes various routing techniques to rout calls based on calling and/or called party information, least cost routing, day of week, time of day, and the like to minimize the processing impact on the softswitch 114. It is noted that in an alternative embodiment, the subscriber may register with an application server 140, where the information is subsequently forwarded to the softswitch 114 via the IP network 102.

At step 206, the subscriber logs into the user profile administration system (UPAS) 118 and establishes a user ID and password. In one embodiment, the UPAS is a web-based application program that allows the user to create their personalized profile information. At optional step 208, the user records one or more alerting announcements. For example, the user may record a business type audible greeting such as "Hello, this is Jane Doe of Lucent Technologies calling". Other alerting announcements may be personalized for family and friends, among other types of greetings. Alternatively, the user may decide not to record a personalized message, but rather, select a prerecorded message that is provided by the service provider. The audio message is then stored on the media server 144 as discussed above.

At step 210, the user creates one or more user profiles with caller profile information. The user may upload one or more caricatures or other visual or audible information (e.g., personal digital images) that a called party may view while listening to the alert message. The caricatures may be any image (e.g., JPEG, GIF, vector graphics, a streaming video format (Flash format), among others) that the subscriber would like the called party to view during the alert and optionally during the session itself. Further, the audible information may be any digital representation of actual or synthesized sound waves (e.g., wav, AIFF, SDII, among others).

Alternatively, the service provider 110 may provide a list of caricatures (e.g., animated attributes) that the user may select as a visual alert. For example, a business profile may include an animated picture of an office, a person in a business suit, among others. The caricatures may include hobby related images (e.g., golfing, sailing, and the like), home images (e.g., pictures of family members, home, pets, and the like), images representing mobile usage (e.g., airplane and the like), among other images. Other user profile information includes user name, user location, and pre-recorded announcements, among others.

The user may also provide caller profile information. Caller profile information includes attributes regarding when to send the user defined profile caricatures. Such caller profile options include always sending the profile, prompting the caller about sending a profile, prompting the caller about which profile to send, restricted use (e.g., parental control over time of day, content, and the like), sending a profile based on the telephone number of the called party, and the like. In this latter instance, the caller may associate a particular caricature for a particular telephone line number of a called party. For example, a caller may send a digital business picture of him/herself to selected client numbers. Alternatively, the caller may send a caricature of a hobby to members in a club (e.g., animated or still picture caricature depicting old coins to members of a coin club).

Once the user has reviewed and selected the user profile attributes, at step 212, the user profile administration system 118 saves the user profile and caller profile information, which is stored at the profile database 142 of the application server 140. Further, recall, that the recorded announcements may be pre-recorded announcements selected from a list provided by the service provider 110, or announcements actually recorded by the user. At step 214, the recorded announcements are stored at the media server 144. The UPAS 118 also instructs the softswitch 114 that serves the user's line to identify the subscriber's line as a participant of the animated/digitally depicted interactive voice session (ADDIVS). It is noted that a user may create or modify their profile at any time based on the user's requirements. At step 216, the method 200 ends.

Figure 3A:
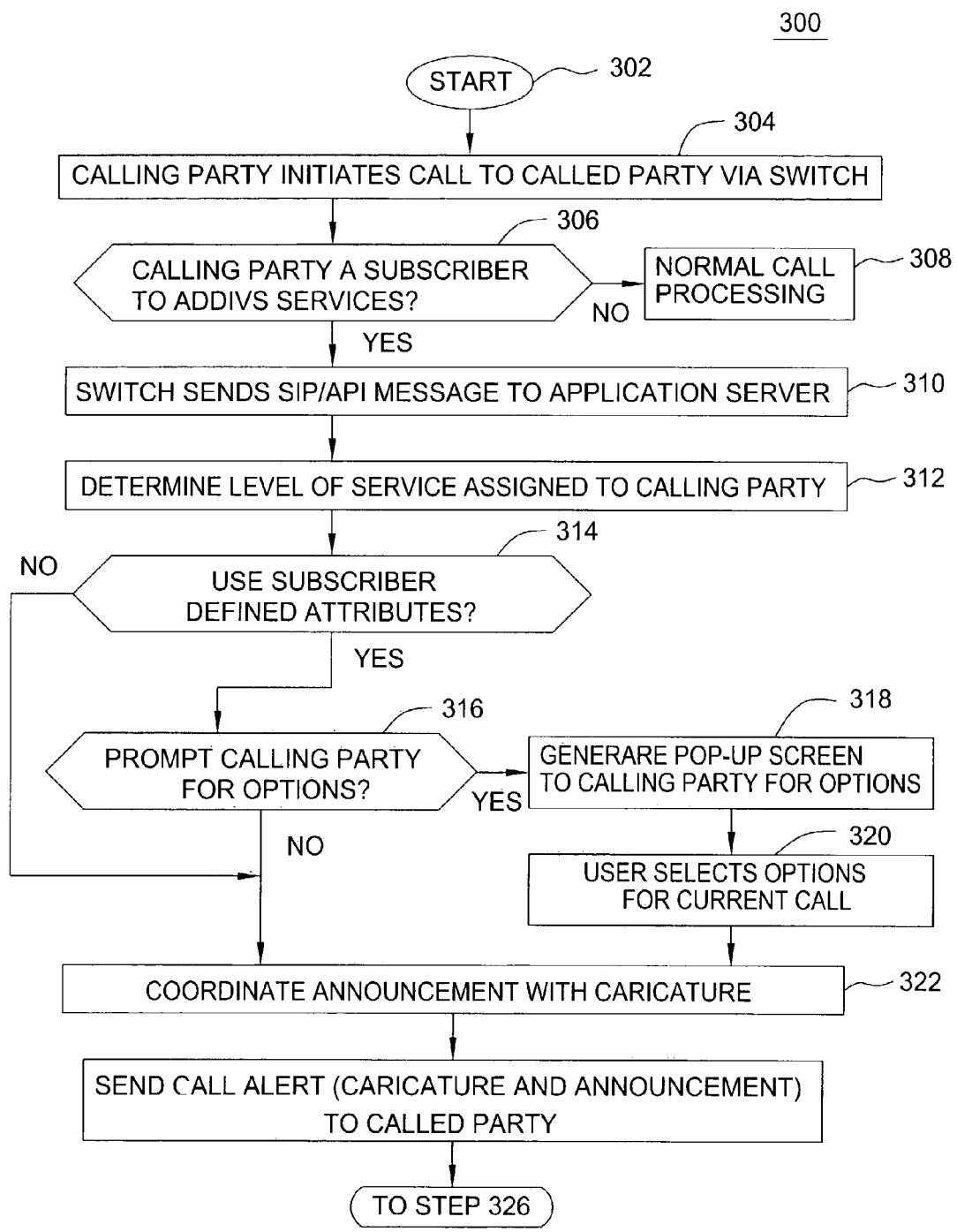
FIGS. 3A and 3B together depict a flow diagram of a method for providing the caricature during an interactive voice session.
Figure 3B:
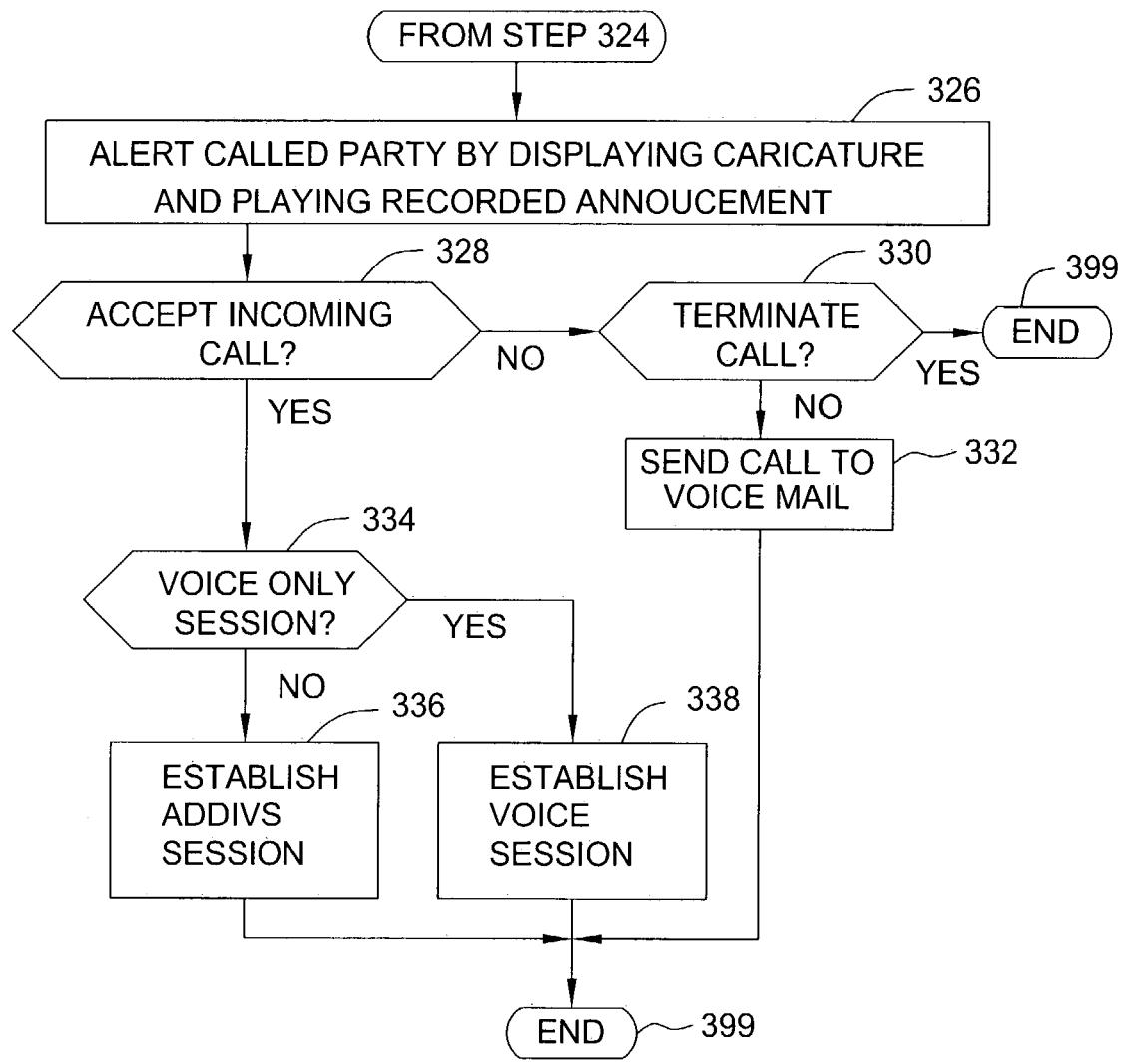
Figure 4:
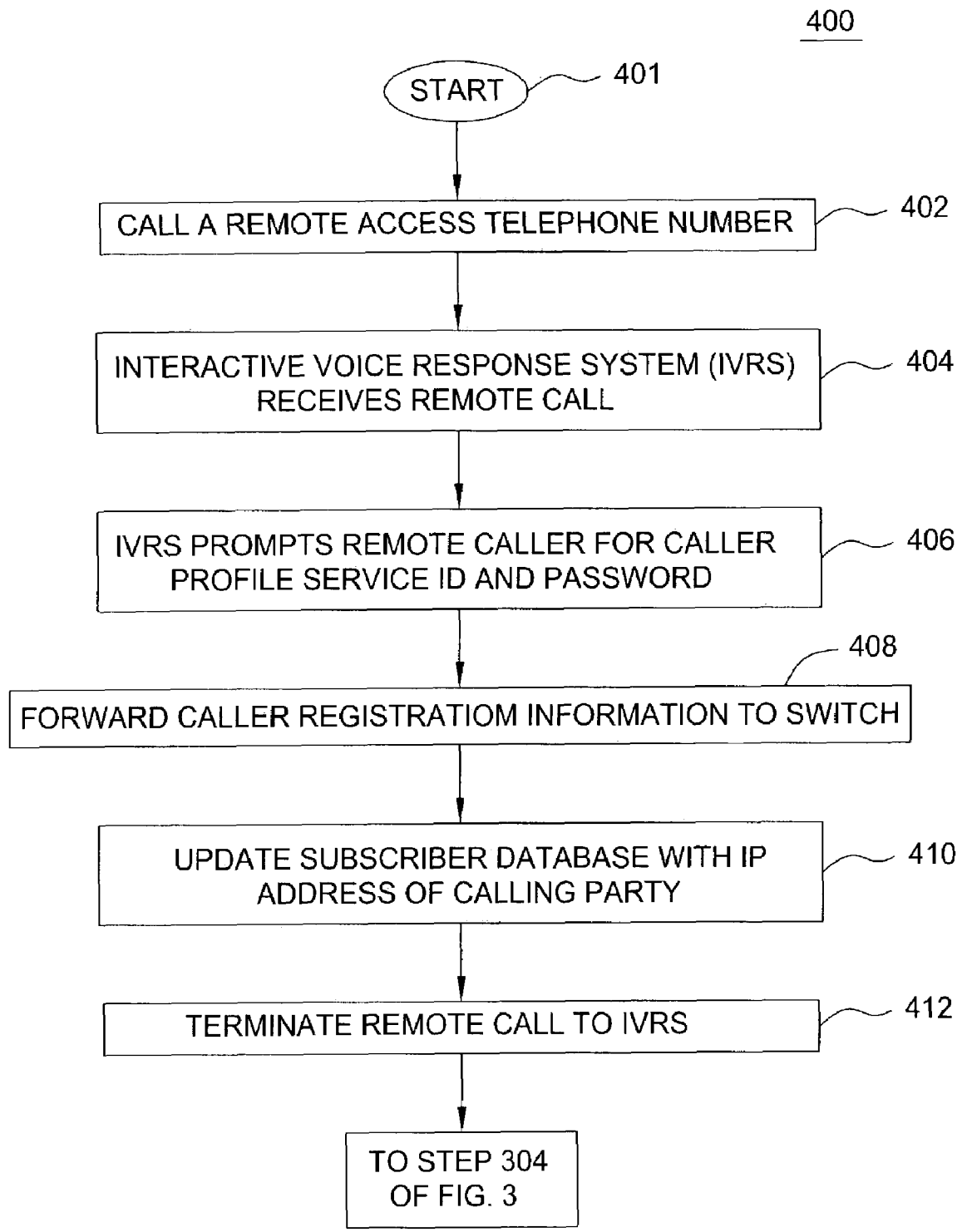
FIG. 4 depicts a flow diagram of a method for providing the caricature during an interactive voice session from a non-subscriber line.

FIGS. 3A and 3B together depict a flow chart of a method 300 for providing the caricature during an interactive voice session. The method 300 starts at step 302, where a calling party has already created a caricature profile with the service provider 110 as described by method 200 of FIG. 2. Recall, the term "caricature" is defined to include either digital images or animated images uploaded to the service provider 110 by the user, or video images provided by the service provider 110 and selected by the user to create their calling profile.

At step 304, the calling party (e.g., subscriber device $120_1$ of FIG. 1) initiates a call over the IP network 102 to another subscriber to the service provider 110 (e.g., subscriber device $120_2$). The call is initiated from the subscribers SIP based softclient loaded on their subscriber device 120. The call is routed to a softswitch 114 serving such calling party, and at step 306, the softswitch 114 checks the calling line to confirm that the caller subscribes to the ADDIVS services. If at step 306, the calling party is not a subscriber to the ADDIVS services, then at step 308, the call proceeds as a normal VoIP service without any personalized caricatures or announcements. If at step 306 the calling party is a subscriber to the ADDIVS services, then the method 300 proceeds to step 310.

At step 310, the softswitch 114 sends a SIP/API message to the application server 140. In particular, the call is sent to either a SIP based application server, or an internal API message sent to a server with third party call control using a SIP interface. At step 312, the application server 140 checks the profile database 142 for pre-provisioned service settings. That is, the application server 140 identifies the level of service of the calling party. Different service levels may be provided for various calling parties. For example, a service provider 110 may implement a default caricature that is sent to various types of called parties when the calling party initiates a call. For example, subscribers from a corporate environment may have a corporate logo (e.g., a telephone company logo) and message pre-selected as a blanket default caricature and message provided by the service provider 110. Alternatively, where there is no default caricature/message implemented by a service provider 110, a user-defined caricature such as the caricatures discussed above, may be implemented when the calling party initiates a call. Such levels of service are indicated in the subscriber profile database 142 for each subscriber.

At step 314, a determination is made by the application server 140 to identify which service level applies to the calling and called party. If at step 314, the calling party has a service level that provides attributes defined by the subscriber (i.e., caricatures and voice messages), then the method 300 proceeds to step 316.

At step 316, a determination is made whether to prompt the calling party for options. Recall, that in step 210 of method 200, the user may create more than one caricature and announcement for their profile. If the caller does not initially associate a particular caricature and announcement with a called number, then the calling party is prompted to provide provisioning options for the alert in real time (i.e., "on-the-fly").

At step 318, the caller is provided an option to select a particular caricature and announcement with service attributes before proceeding with the alert and call session. Specifically, at step 318, the calling party is prompted (e.g., pop-up window) to select service options regarding the alert and session, and at step 320, the caller selects the desired caricature and announcement. The method 300 then proceeds to step 322. However, if at step 316 the caller has previously associated a caricature and announcement with the called party's number (or SIP URL), then steps 318 and 320 are omitted, and the method 300 proceeds to step 322.

Moreover, if at step 314, the query is answered negatively, where the service provider 110 chooses to select service attributes for these call scenarios, the default is provisioned by the application server 140, thus eliminating the pop-up prompt to the calling party. As such, steps 316 through 320 are omitted and the method proceeds to step 322.

Thus, the implementation of handing the call off to the application server 140 is to establish a SIP session between the calling party and the application server 140. The application server 140 retrieves the pre-provisioned profile information on the calling party and called party to determine service attributes in order to initiate an "invitation" to the called party for the interactive voice session.

At step 322, the application server associates the announcement with the caricature. In particular, the application server 140 retrieves the specific caricature assigned for the present call, as well as instructs the media server 144 to coordinate the playing of the announcement with the caricature. In particular, the application server 140 notifies the media server 144 to retrieve the audio file pre-selected by the subscriber or service provider 110 for alerting the called party.

At step 324, the call alert, which includes the personalized caricature and recorded announcement is sent to the called party, and at step 326, the called party is alerted of the incoming call. In particular, the application server 140 establishes a separate session (e.g., SIP session) with the called party's subscriber device 120, where a data stream is sent from the application server 140 to the called party's subscriber device 120 via the IP network 102.

Once the caricature and recorded message is received by the called party's subscriber device 120, the subscriber device 120 processes the packetized video and audio information in a conventional manner as is known in the art to displays the caricature on the called party's display, and play the recorded message over the sound system. For example, in one embodiment, the data stream may comprise the caricature and voice messaging data packets only, where an executable application program previously loaded on the subscriber device 120 is executed upon receiving such packet stream. When executed, the application program provides, illustratively, a "pop-up" window displaying the caricature while playing the audio to thereby alert the called party of an incoming call. In a second embodiment, an executable file containing the animated caricature information and voice messaging is sent to the subscriber device 120 for execution and generation of the exemplary pop-up window on their subscriber device 120.

At step 328, the called party may either accept or reject the call. If at step 328, the called party rejects the incoming call, then the called party may, at step 330, terminate the call at step 330 and proceed to step 399 where the method 300 ends. Alternatively, at step 332, the called party may send the incoming call to voice mail for future review, and at step 399, the method 300 ends.

At step 328, if the called party accepts the incoming call, and at step 334, the called party desires a voice only session, then at step 338, a voice only session is established between the caller and called party. It is noted that if the called party is also a subscriber to the ADDIVS services, then the called party has the additional option, at step 336, to establish the ADDIVS between the caller and called party. In this case, the caller and called party a may view the caricature sent by the caller. Once the call is sent to voice mail at step 332, or the voice session is terminated by the parties at step 338, or the caricature session is terminated by the parties at step 336, the method 300 proceeds to step 399, where the method 300 ends. It is noted that if the called party is not a subscriber of the service provider 110, then the softswitch 114 utilizes its routing tables to process the call as a voice session only, and thereby bypasses the application server 140 altogether. However, one skilled in the art will appreciate that a service provider service level agreement (SLA) may allow the service provider 110 to enable such ADDIVS services of the present invention in some form to called parties who are not subscribers, as long as such non-subscribers have the necessary equipment (subscriber device and software) to participate in such service. For example, a service provider 110 may wish to provide such ADDIVS services during a service promotion for some limited time to users in a particular geographic area.

The ADDIVS services also allow a calling party to place calls to users who are mobile. Specifically, the subscriber server 112 also function as a location server to monitor the location of the subscribers. In particular, the location server 112 tracks the subscriber's location by utilizing a specific prefix (e.g., IP address) assigned each time a caller registers or logs on for services. That is, each time a calling party initiates a call the IP address is shared with the proxy servers/location servers in the network 100. The incoming registration messages are routed to the softswitch 114, where the subscriber database 116 is updated with the current IP address of the caller. Once the called party is located via the IP address, the ADDIVS automatically knows which profile to send based on the called number registered in the caller profile. As discussed above, the ADDIVS service allows the caller to associate a particular profile with one or more numbers of called parties the caller desires to contact.

FIG. 4 depicts a flow diagram of a method 400 for providing the alerting services during an interactive voice session from a non-subscriber line. In particular, a calling subscriber may not have access to their normal subscriber line and may be using a third party line. Thus, method 400 provides a technique for accessing the ADDIVS from such a third party line.

Specifically, method 400 starts at step 401 and proceeds to step 402, where the caller calls a remote activation telephone number. The remote access telephone number may be one of a plurality of remote access telephone numbers provided to the subscribers. At step 404, a switch that serves the remote telephone line receives the call on an interactive voice response system (IVRS), and at step 406, the IVRS prompts the caller to enter their caller profile service ID and passwords. It is noted that IVRS receives the IP address of the called party from the register SIP message. At step 408, the IVRS forwards the SIP registration message to the softswitch 114, where the caller is verified as being a subscriber. At step 410, the subscriber database 116 is updated with the new IP address of the calling party. The IVRS then generates a confirmation announcement to the caller. At step 412, the caller terminates the remote call to the IVRS.

The method 400 then proceeds to step 304 of method 300, where the calling party initiates a call from the remote line to the called party. Specifically, the remote call is first routed via proxy/location servers to the softswitch 114, and subsequently routed to either a non-subscriber via the PSTN 106, or to the application server 140, as discussed above with regard to method 300 of FIG. 3. Thus, the animated/digital depicted interactive voice session services allows the users to flexibly control the information that they want to be presented, as well as providing an amenable call alert system.

Although various embodiments that incorporate the teachings of the present invention have been shown and described in detail herein, those skilled in the art can readily devise many other varied embodiments that still incorporate these teachings.

What is claimed is:

1. A method for providing a telecommunications service, comprising:
   associating, with each of a plurality of subscribers, at least one audible message and at least one visual caricature;
   in response to a first subscriber attempting to establish a communications link to a second subscriber, selecting one of the at least one visual caricature and one of the at least one audible message based on a service level of the first subscriber, wherein the service level is determined from service level information comprising indicia of whether to provide service provider default visual caricatures and audible messages or subscriber defined visual caricatures and audible messages;
   associating the selected visual caricature with the selected audible message; and
   transmitting to said second subscriber the associated visual caricature and audible message.

2. The method of claim 1, further comprising:
   registering each subscriber for said telecommunications service.

3. The method of claim 2, wherein said registering step comprises:
   prompting a subscriber to generate at least one audible message;
   prompting said subscriber to generate said at least one visual caricature; and
   in response to a subscriber generating said at least one audible message and said at least one visual caricature, storing said at least one audible message and said at least one visual caricature at a subscriber profile database.

4. The method of claim 1, wherein said establishing said communications link comprises:
   establishing a first communications path from a first subscriber device of said first subscriber to a softswitch via session initiation protocol (SIP) signaling; and
   establishing a second communications path from said softswitch to a second subscriber device of said second subscriber via said SIP signaling.

5. The method of claim 4, further comprising:
   prompting said second subscriber to accept, reject, or send to volcemail, said communications link.

6. A method for providing interactive voice session services over an IP network, comprising:
   receiving an incoming call from a calling party to a called party over said IP network;
   selecting a visual caricature and an audible message based on a service level of said calling party, wherein the service level is determined from service level information comprising indicia of whether to provide service provider default visual caricatures and audible messages or subscriber defined visual caricatures and audible messages;
   associating the selected visual caricature of said calling party with the selected audible message; and sending said associated visual caricature and audible message to the called party over the IP network for presentation as a call alert for the incoming call.

7. The method of claim 6, further comprising:
registering a subscriber for said services; and
storing registration information at a subscriber database and a profile database.

8. The method of claim 7, wherein said registering step further comprises:
prompting a subscriber to generate at least one subscriber defined audible message;
prompting said subscriber to generate at least one subscriber defined visual caricature; and
in response to a subscriber generating said subscriber defined visual caricature and audible message, storing said subscriber defined visual caricature and audible message at said profile database.

9. The method of claim 8, further comprising storing said subscriber defined audible message at a media server.

10. The method of claim 8, further comprising prompting said subscriber for options for selecting a particular subscriber defined visual caricature and audible message from a plurality of subscriber defined visual caricatures and audible messages.

11. The method of claim 10, wherein selecting said subscriber defined visual caricature and audible message is performed based on at least one of a time of day, a called party, a calling party, a default, and a called phone number.

12. The method of claim 6, wherein said receiving step further comprises:
determining whether said incoming call is initiated from a subscriber of said services;
in an instance where said incoming call is not initiated from a subscriber, processing said incoming call as a voice session; and
in an instance where said incoming call is initiated from a subscriber, routing said incoming call to an application server for further processing, wherein said visual caricature and audible message are sent to a subscriber device of the called party over the IP network.

13. The method of claim 12, wherein said selecting step further comprises:
Identifying a service level of said called party.

14. The method of claim 6, further comprising:
in response to said service level being identified as a service provider default visual caricature and service provider default audible message, selecting and associating one of said service provider default visual caricatures and one of said service provider default audible messages; and
sending said service provider default visual caricature and service provider default audible message to a subscriber device of said called party.

15. The method of claim 6, further comprising:
in response to said service level being identified as a subscriber defined visual caricature and subscriber defined audible message, selecting and associating one of said subscriber defined visual caricatures and one of said subscriber defined audible messages; and
sending said subscriber defined visual caricature and subscriber defined audible message to a subscriber device of said called party.

16. The method of claim 15, further comprising:
prompting said calling party for further options regarding said subscriber defined visual caricature and said subscriber defined audible message.

17. The method of claim 16, wherein said further options comprise:
selecting said subscriber defined visual caricature and said subscriber defined audible message from a plurality of subscriber defined visual caricatures and a plurality of subscriber defined audible messages for presentation as the call alert for the incoming call.

18. The method of claim 6, further comprising:
prompting said called party via said call alert to accept, reject, or send to voicemail, said incoming call.

19. The method of claim 6, wherein said visual caricature comprises a digital image selected from the group consisting of JPEG, GIF, vector graphics, and steaming video format images.

20. The method of claim 6, wherein said receiving step comprises receiving an incoming call from a remote location.

21. The method of claim 20, further comprising in response to said incoming call being initiated from a remote location of said calling party, and prior to receiving said remote incoming call at an interactive voice response system:
prompting said calling party for caller service verification; and
updating a subscriber database with an IP address of said calling party from said remote location.

22. The method of claim 20, further comprising:
terminating said remote incoming call to said interactive voice response system after updating said subscriber database.

23. An apparatus for providing digitally depicted interactive voice session services over an IP network, said apparatus in communication with calling party and called party subscriber devices, said apparatus comprising:
at least one softswitch having a subscriber database coupled to said IP network;
at least one application server having a profile database coupled to said IP network, said profile database storing a plurality of visual caricatures and a plurality of audible messages associated with a calling party;
wherein said application server receives an indication of an incoming call from a calling party to said called party, selects one of said visual caricatures and one of said audible messages based on a service level of the calling party determined from service level information comprising indicia of whether to provide service provider default visual caricatures and audible messages or subscriber defined visual caricatures and audible messages, and associates said selected visual caricature and said selected audible message for delivery to said called party subscriber device over the IP network.

24. The apparatus of claim 23, wherein said subscriber devices serve as endpoints in said network and utilize session initiation protocol (SIP) signaling for establishment, modification, and termination of conferencing and telephony sessions over the IP network.

25. The apparatus of claim 23, wherein said visual caricature comprises a digital image selected from the group consisting of JPEG, GIF, vector graphics, and steaming video format images.

26. The apparatus of claim 23, wherein said subscriber database comprises registration information and said service level information for subscribers to a service provider offering said digitally depicted interactive voice session services.

27. The apparatus of claim 24, wherein said plurality of subscriber devices are selected from a group consisting of a laptop computer, personal digital assistant (PDA), wireless handheld device, and desktop computer.

28. The apparatus of claim 24, wherein said application sever coordinates the visual caricature and audible message for delivery to a subscriber device of a called party.

29. The apparatus of claim 24, further comprising a media server coupled to said IP network, said media server storing said audible messages.

30. The apparatus of claim 24, further comprising a subscriber server having a user profile administration system (UPAS) for generating said visual caricatures and audible messages.

* * * * *